2,995,590
ALKOXYSILANES

Robert L. Peeler, Albany, and Steve A. Kovacich, El Cerrito, Calif., assignors to California Research Corporation, San Francisco, Calif., a corporation of Delaware
No Drawing. Filed June 30, 1958, Ser. No. 745,308
5 Claims. (Cl. 260—448.8)

This invention relates to novel alkoxysilanes. More particularly, the invention is concerned with a novel class of alkyltrialkoxysilanes having improved properties.

Alkoxysilanes, or silicate esters as they are often called, are generally characterized by unusually good viscosity-temperature properties, superior lubricity and low volatility which make them attractive as high temperature hydraulic fluids and lubricants. A great many of the esters, however, are unstable, particularly at high temperatures and in the presence of water. This instability makes them objectionable for a number of important uses.

We have now discovered a novel class of silicate esters having improved properties, namely, the alkyltrialkoxysilanes wherein the alkyl group contains from 2 to 12 carbon atoms, two of the alkoxy groups contain from 3 to 13 carbon atoms each and one of the alkoxy groups is a tertiary alkoxy group containing from 4 to 8 carbon atoms.

The silicate esters of the present invention possess outstanding properties which are considered desirable for hydraulic fluids and lubricants. Their hydrolytic stability, particularly at high temperatures, is excellent and this, as stated above, is unusual for silicate esters. They also have excellent viscosity-temperature properties which permit their effective use over a wide range of temperatures.

The alkyltrialkoxysilanes of the invention are illustrated by the following structural formula:

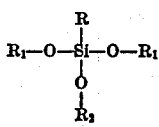

wherein the R is an alkyl group of from 2 to 12 carbon atoms, the $R_1$'s, which may be the same or different from one another, are alkyl groups of from 3 to 13 carbon atoms and the $R_2$ is a tertiary alkyl group of from 4 to 8 carbon atoms. Preferably the R is an alkyl group of from 2 to 6 carbon atoms, the $R_1$'s are primary or secondary alkyl groups of from 3 to 10 carbon atoms and the $R_2$ is a tertiary alkyl group of from 4 to 6 carbon atoms. Such preferred alkyl groups provide alkyltrialkoxysilanes which are unusually stable at high temperatures and in the presence of water.

Alkyltrialkoxysilanes, illustrative of the invention as described above, include:

Ethyl-tert-butoxydi(2-ethylhexoxy)silane
Ethyl-tert-pentoxydi(2-ethylbutoxy)silane
Ethyl-tert-pentoxydi(1-octoxy)silane
Pentyl-tert-butoxydi(2-ethylhexoxy)silane The novel alkyltrialkoxysilanes of the invention are prepared by several different methods. According to one method, one mol of commercially available alkyltrichlorosilane is reacted with three mols of alcohol, the alkyl groups of the silane and alcohol being of the type mentioned above. The reaction is desirably carried out in the presence of an acid acceptor such as alpha picoline or pyridine due to the tertiary alkoxy group which retards reaction. Heating is employed, usually at reflux temperatures of the alcohol mixture to accelerate the reaction. The alkyltrialkoxysilane is conveniently separated by conventional means such as fractional distillation. As an illustration of this type of reaction, one mol of ethyltrichlorosilane is reacted first with two mols of 2-ethylhexanol and then with one mol of tertiary butanol in the presence of alpha picoline to give ethyl-tert-butoxydi(2-ethylhexoxy)silane.

In another method of preparing the alkyltrialkoxysilanes of the invention, a more comprehensive process is employed. In this process the alkyltrialkoxysilane is produced in the form of a mixture with other valuable silicate esters. One mol of an alkyltrichlorosilane is reacted with one mol of an alcohol. The alkylalkoxydichlorosilane thus obtained is then reacted with additional alcohol in the presence of alpha picoline and water. The product is a mixture of alkyltrialkoxysilane and dialkyltetralkoxydisiloxane. The alkyltrialkoxysilane is separated from the mixture by fractional distillation.

The following examples are given as additional illustrations of the preparation of the novel alkyltrialkoxysilanes of the invention. Unless otherwise specified, the proportions are given on a weight basis.

EXAMPLE 1

454 grams of ethyltrichlososilane was dissolved in 250 ml. toluene and added to a 2-liter reaction flask. The mixture was cooled to −20° C. and held at that temperature while 284 grams of 2-ethylbutanol was added dropwise. After 1 additional hour at this temperature, the reaction mixture was allowed to come to room temperature overnight. Any hydrogen chloride by-product remaining in the mixture was removed by blowing with nitrogen for one-half hour. Toluene was stripped off and a product identified as ethyl-2-ethylbutoxydichlorosilane was collected by distillation at 95 to 102° C. vapor temperature under 14.7 mm. Hg pressure. To 372 grams of this dichlorosilane in a 2-liter reaction flask was added 175 ml. alpha picoline and 200 ml. toluene. This mixture was cooled to 0° C. and a mixture of 143 grams tert-pentyl alcohol, 175 ml. alpha picoline acid acceptor and 200 ml. toluene was added at this temperature over a period of 2 hours. The reaction mixture was allowed to come to room temperature overnight. It was then refluxed 4 hours at 126° C. After cooling to room temperature, 14.6 ml. water was added dropwise, a maximum temperature of 38° C. being reached. The mixture was then heated 3 hours at 100 to 106° C. After cooling to room temperature, 600 ml. of water was added and stirred until all alpha picoline·HCl salt formed in the reaction had dissolved. The mixture was allowed to stand and an aqueous phase which settled was discarded. The product layer was washed 3 times with 600 ml. water and dried over anhydrous sodium sulfate. The product was distilled at 1 mm. Hg pressure in a spinning band column. The fraction boiling betwen 112 and 117° C. was collected as ethyl-tert-pentoxydi (2-ethylbutoxy)silane.

Additional preparations of the alkyltrialkoxysilanes according to the invention and related materials for the purpose of comparison were carried out employing the procedures as outlined above. The properties of these alkyltrialkoxysilanes are summarized in the following table.

Table I

| Example No. | Compound | Boiling point, °C./mm. | Viscosity, cs. 100° F. | Viscosity, cs. 210° F. | ASTM slope, 100/210° F. | Silicon, percent Found | Silicon, percent Calc. | Carbon, percent Found | Carbon, percent Calc. | Hydrogen, percent Found | Hydrogen, percent Calc. |
|---|---|---|---|---|---|---|---|---|---|---|---|
| 2 | Ethyl-tert-butoxydi(2-ethylhexoxy)silane. | 139–171/1 | 4.338 | 1.521 | 0.82 | 7.50 | 7.23 | | | | |
| 3 | Ethyl-tert-pentoxydi(1-octoxy)silane. | 159–160/1 | 4.343 | 1.591 | 0.78 | | | | | | |
| 4 | Pentyl-tert-butoxydi(2-ethylhexoxy)silane. | 148–152/1 | 5.641 | 1.849 | 0.78 | 5.75 | 6.52 | 68.28 | 69.70 | 11.86 | 12.63 |
| 5 | Methyl-tert-butoxydi(2-ethylhexoxy)silane. | 121–128/1 | 3.77 | 1.41 | 0.82 | 7.26 | 7.50 | 67.16 | 67.32 | 12.59 | 12.38 |
| 6 | Phenyl-tert-butoxydi(2-butoxy)silane. | 108–114/1 | 4.161 | 1.445 | 0.85 | | | | | | |

In the above examples, the methyl and phenyltrialkoxysilanes are included for the purpose of comparative evaluation.

A series of tests was carried out to illustrate the superior properties of the novel alkyltrialkoxysilanes of the invention. These tests show their excellent hydrolytic stability at elevated temperatures compared to other silicate esters of the same general type. In the tests, 10.00 ml. of the alkyltrialkoxysilane and 0.60 ml. of water are placed in a 22 ml. nickel bomb. The bomb is closed and rotated at 5 r.p.m. in an oven maintained at 400° F. At the end of 20 hours, the bomb is removed from the oven. The test fluid is taken from the bomb and centrifuged. Following centrifugation, the liquid portion is decanted for viscosity measurements. Insolubles remaining after decanting are washed with chloroform, dried and weighed.

The results of the 20-hour tests on the alkyltrialkoxysilanes of the invention are given in the following table. For comparison, test results are also included in the table showing the hydrolytic stability of other types of silicate esters.

Table II

| Compound | Viscosity, 100° F. | Change, Percent 210° F. | Insolubles, Percent |
|---|---|---|---|
| Ethyl-tert-butoxydi(2-ethyl-hexoxy)silane | −0.3 | −3.9 | 0.01 |
| Ethyl-tert-pentoxydi(2-ethyl-butoxy)silane | −5.2 | +6.9 | 0.01 |
| Ethyl-tert-pentoxydi(1-octoxy)silane | −2.3 | −7.3 | 0.16 |
| Pentyl-tert-butoxydi(2-ethyl-hexoxy)silane | −6.8 | −8.6 | 0.02 |
| Tetra(2-ethylhexoxy)silane | −13.0 | −42.2 | 15.9 |
| Tetra(2-ethylbutoxy)silane | | +2.0 | 5.12 |
| Tetra(2-pentoxy)silane | | −25.6 | 5.98 |
| Tert-butoxytri(2-octoxy)silane | | | 0.54 |
| Methyl-tert-butoxydi(5-ethyl-2-nonoxy)silane | −9.9 | +28.8 | 2.50 |
| Phenyl-tert-butoxydi(2-butoxy)silane | −7.8 | | 0.84 |
| Dimethyldi(5-ethyl-2-nonoxy)silane | +37.0 | −20.2 | 0.01 |

From the above test results, it will be seen that the alkyltrialkoxysilanes of the present invention are quite stable to hydrolysis at high temperatures. There is very little change in the viscosity of the silanes after the prolonged heating at 400° F. in the presence of water. Furthermore, there is very little formation of insolubles. By way of contrast, tetraalkoxysilanes, methyltrialkoxysilanes, phenyltrialkoxysilanes, and dimethyldialkoxysilanes are shown to be much less stable. Undesirably large changes in viscosity are sustained with such silanes, or the formation of insolubles is unsatisfactorily high in each instance.

The unusual stability of the alkyltrialkoxysilanes, according to the present invention, makes them particularly valuable as hydraulic fluids and lubricants in applications where high temperatures are encountered. The fact that they maintain excellent viscosity-temperature properties is particularly important since minimum viscosity changes throughout wide temperature ranges are required. Resistance to the formation of insoluble particles of silica is also critical since such materials obviously interfere with proper functioning of hydraulic and lubrication systems.

The outstanding hydrolytic stability of the novel alkyltrialkoxysilanes of the invention was also demonstrated in additional tests under still more stringent conditions. In these particular tests the same procedure, as outlined above, was employed, except that the test was carried out over a prolonged period of 100 hours. The results of these 100-hour tests are given in the following table. Included are examples of both alkyltrialkoxysilanes according to the invention and also other types of silicate esters for the purpose of comparison.

Table III

| Compound | Viscosity, 100° F. | Change, Percent 210° F. | Insolubles, Percent |
|---|---|---|---|
| Ethyl-tert-butoxydi(2-ethylhexoxy)silane | +69.6 | +12.3 | 0.07 |
| Ethyl-tert-pentoxydi(2-ethylbutoxy)silane | +34.0 | +10.6 | 0.13 |
| Di(tert-butoxy)di(2-ethylhexoxy)silane | −16.5 | −19.5 | 5.75 |
| Tert-butoxytri(2-ethylhexoxy)silane | | −42.4 | 7.50 |

The above test results show that the alkyltrialkoxysilanes of the invention are much more stable to hydrolysis at high temperatures over an extended period of time than comparable alkoxysilanes without the alkyl group.

We claim:

1. An alkyltrialkoxysilane having the general structural formula:

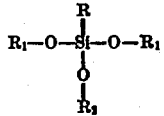

wherein the R is an alkyl group of from 2 to 6 carbon atoms, the $R_1$'s are alkyl groups selected from the class consisting of primary and secondary alkyl groups of 6 and 8 carbon atoms each and mixtures thereof, and $R_2$ is a tertiary alkyl group of from 4 to 6 carbon atoms.

2. Ethyl-tert-butoxydi(2-ethylhexoxy)silane.
3. Ethyl-tert-pentoxydi(2-ethylbutoxy)silane.
4. Ethyl-tert-pentoxydi(1-octoxy)silane.
5. Pentyl-tert-butoxydi(2-ethylhexoxy)silane.

References Cited in the file of this patent

UNITED STATES PATENTS

| | | |
|---|---|---|
| 2,566,365 | Pedlow et al. | Sept. 4, 1951 |
| 2,643,964 | Johannsen | June 30, 1953 |
| 2,713,064 | Weyenberg | July 12, 1955 |
| 2,717,242 | Foehr | Sept. 6, 1955 |

OTHER REFERENCES

Smith: "Chem. Abstracts," vol. 49 (1955), pp. 909–10.

Okawara et al.: "Bull. Chem. Soc. Japan," vol. 27 (1954), pp. 582–85 (Chem. Abstracts, vol. 50 (1956), pp. 162–63).

Peeler et al.: "Ind. and Eng. Chem.," vol. 51 (1959), pp. 749–52.